(12) United States Patent
Woodell et al.

(10) Patent No.: US 8,098,189 B1
(45) Date of Patent: Jan. 17, 2012

(54) WEATHER RADAR SYSTEM AND METHOD USING DUAL POLARIZATION ANTENNA

(75) Inventors: Daniel L. Woodell, Cedar Rapids, IA (US); James B. West, Cedar Rapids, IA (US); Wajih A. ElSallal, Cedar Rapids, IA (US); John C. Mather, Cedar Rapids, IA (US); Brian J. Herting, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 83 days.

(21) Appl. No.: 12/236,471

(22) Filed: Sep. 23, 2008

(51) Int. Cl.
*G01S 13/00* (2006.01)

(52) U.S. Cl. .................... 342/26 R; 342/26 B; 342/188; 343/767; 343/771; 343/770

(58) Field of Classification Search .................. 342/26 B
See application file for complete search history.

(56) References Cited

U.S. PATENT DOCUMENTS

| | | | |
|---|---|---|---|
| 2,930,035 A | 3/1960 | Altekruse | |
| 2,965,894 A | 12/1960 | Sweeney | |
| 2,994,966 A | 8/1961 | Senitsky et al. | |
| 3,153,234 A | 10/1964 | Begeman et al. | |
| 3,212,088 A | 10/1965 | Alexander et al. | |
| 3,241,141 A | 3/1966 | Wall | |
| 3,325,807 A | 6/1967 | Burns et al. | |
| 3,397,397 A | 8/1968 | Barney | |
| 3,521,287 A * | 7/1970 | Fee | 343/771 |
| 3,665,480 A * | 5/1972 | Fassett | 343/754 |
| 3,739,380 A | 6/1973 | Burdic et al. | |
| 3,815,132 A | 6/1974 | Case, Jr. et al. | |
| 4,760,396 A | 7/1988 | Barney et al. | |
| 5,369,379 A * | 11/1994 | Fujiki | 333/116 |
| 5,831,583 A * | 11/1998 | Lagerstedt et al. | 343/771 |
| 5,923,296 A * | 7/1999 | Sanzgiri et al. | 343/700 MS |
| 5,945,926 A | 8/1999 | Ammar et al. | |
| 6,127,985 A * | 10/2000 | Guler | 343/771 |
| 6,456,229 B2 * | 9/2002 | Wurman et al. | 342/59 |
| 6,731,241 B2 * | 5/2004 | Park et al. | 342/361 |
| 6,741,208 B1 * | 5/2004 | West et al. | 342/374 |
| 2007/0139247 A1 * | 6/2007 | Brown et al. | 342/13 |
| 2008/0001836 A1 * | 1/2008 | Guthrie | 343/767 |
| 2008/0150832 A1 * | 6/2008 | Ingram et al. | 343/893 |
| 2009/0102704 A1 * | 4/2009 | Fujimura | 342/25 A |
| 2009/0224964 A1 * | 9/2009 | Raney | 342/25 F |

* cited by examiner

*Primary Examiner* — Timothy A Brainard
(74) *Attorney, Agent, or Firm* — Daniel M. Barbieri

(57) ABSTRACT

An antenna system for a weather radar system includes a first transceiver and a second transceiver. The polarization of the first transceiver is orthogonal to the polarization of the second transceiver. The first transceiver and the second transceiver are interlaced to occupy the same volume.

20 Claims, 6 Drawing Sheets

WEATHER RADAR SYSTEM AND METHOD USING DUAL POLARIZATION ANTENNA

BACKGROUND

The present application relates generally to the field of a weather radar system. More specifically, the present application relates to an antenna system for a weather radar system utilizing dual polarization.

Weather radar systems are used to assess weather altitudes and to separate weather from ground clutter at ranges to the horizon. Conventional antenna systems for weather radar systems generally utilize one of vertical polarization or horizontal polarization, but lack the capability to use simultaneous dual polarization. As a result of using a single polarization, the reliability and failure-free operational time of such radar systems can be limited.

Some dual polarization antenna systems are available but place great demands on traditional two-axis mechanically driven flat plate antenna commercial radar systems. As a result, active microwave electronics are required to be embedded to the aperture of the radar antenna system. The use of such active apertures can decrease reliability of radar antenna systems compared to conventional flat plate systems and can significantly increase system cost. Additionally, conventional antenna feed assemblies lack high cross polarization isolation. Poor received signal strength due to cross polarization can result when using a dual polarized antenna system.

Some aircraft use dual radar installations to insure availability of the radar function, but for those systems a single antenna and antenna positioner are generally used. So while the availability of a dual system is offered by the dual receiver/transmitter (R/T), the non-dual elements limit potential gains to availability. Although most antenna elements are very simple and thus very reliable, the switch used to connect either R/T to the antenna is not a dual element and thus represents a function that may limit the potential improved availability of a dual R/T system. A dual antenna system can be used with each R/T connected to its own antenna except that the typical space allocated to the radar function precludes the use of two separate antennas.

Therefore, there is a need for a simultaneous dual polarization antenna system and method. Furthermore, there is a need for radar system with high cross polarization isolation. Yet further, there is a need for an antenna architecture with increased reliability. Yet further still, there is a need for an antenna system for a weather radar or radar-based terrain avoidance and warning system that utilizes simultaneous or near simultaneous dual polarization. Even further, there is a need for an active radar antenna that exploits two independent orthogonal polarizations to achieve high (higher MTBF) availability weather radar systems, mean time between failures.

SUMMARY

One embodiment of the disclosure relates to an antenna system for a weather radar system. The antenna system includes a first transceiver and a second transceiver. The polarization of the first transceiver is orthogonal to the polarization of the second transceiver. The first transceiver and the second transceiver are interlaced to occupy the same volume.

Another embodiment of the disclosure relates to a method for detecting weather using a weather radar system. The method includes transmitting a first radar beam with a first portion of an antenna, transmitting a second radar beam with a second portion of the antenna, and receiving radar returns from the first and second radar beams at the first and second portions of the antenna. The first portion of the antenna has a polarization that is orthogonal to a polarization of the second portion of the antenna. The first portion of the antenna and the second portion of the antenna are interlaced to occupy the same volume.

A further embodiment of the disclosure relates to an antenna system for a weather radar system. The antenna system includes means for transmitting a first radar beam and receiving radar returns from the first radar beam and means for transmitting a second radar beam and receiving radar returns from the second radar beam. The polarization of the means for transmitting a first radar beam and receiving radar returns from the first radar beam is orthogonal to the means for transmitting a second radar beam and receiving radar returns from the second radar beam. The means for transmitting a first radar beam and receiving radar returns from the first radar beam and the means for transmitting a second radar beam and receiving radar returns from the second radar beam are interlaced to occupy the same volume.

BRIEF DESCRIPTION OF THE DRAWINGS

The disclosure will become more fully understood from the following detailed description, taken in conjunction with the accompanying drawings.

DETAILED DESCRIPTION OF THE EXEMPLARY EMBODIMENTS

Figure 1:
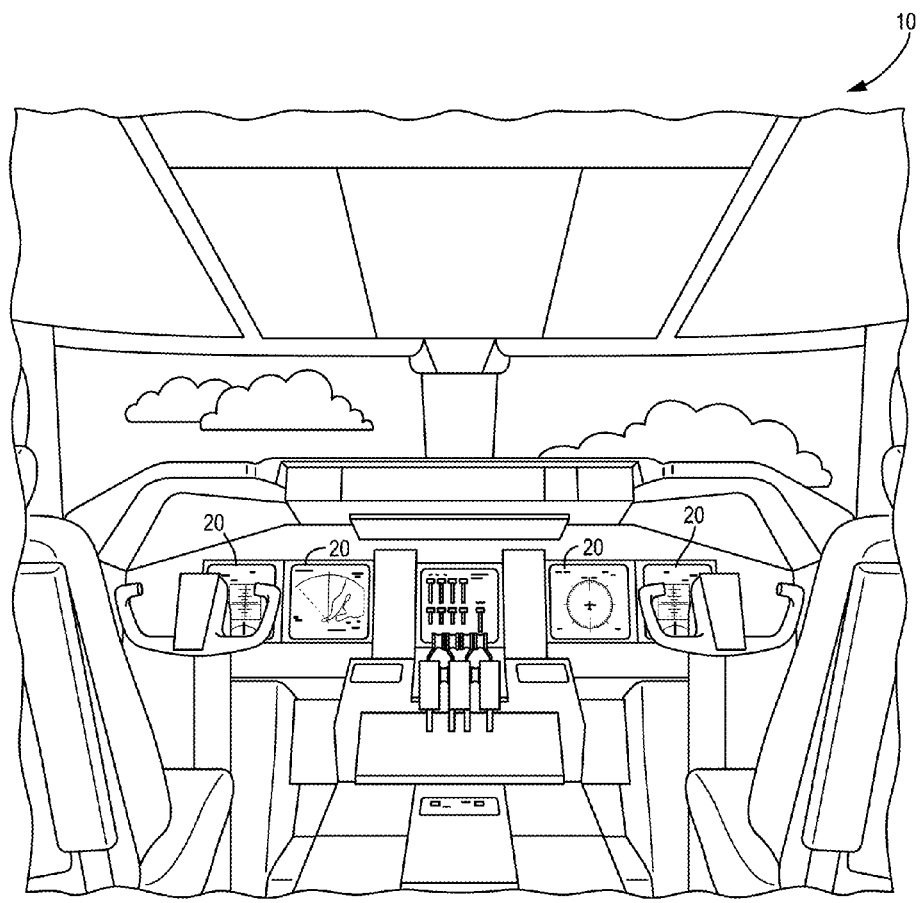
FIG. 1 is an illustration of an aircraft control center or cockpit, according to an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

By interlacing or interdigitating antennas in the same approximate volume as a single antenna, each R/T can be connected to its own antenna without the availability limits produced by a switch used to change connection between a single antenna and two R/Ts. A method for interlacing two antennas may use antenna types that have different polarizations. Target responses vary with the polarization used to examine them and advantageously can be very predictable. The polarization methods can be used for weather characterization such as identification of wet hail radar returns from rain-fall radar returns when the radar is used as a weather radar.

Referring to FIG. 1, an illustration of an aircraft control center or cockpit 10 is shown, according to one exemplary embodiment. Aircraft control center 10 includes flight displays 20 which are used to increase visual range and to enhance decision-making abilities. In an exemplary embodiment, flight displays 20 can provide visual warnings or indications associated with a radar system of the aircraft.

Figure 2:
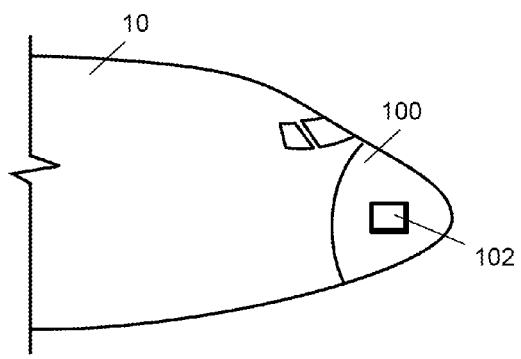
FIG. 2 shows the front of an aircraft with an aircraft control center and nose, according to an exemplary embodiment.

In FIG. 2, the front of an aircraft is shown with aircraft control center 10 and nose 100, according to an exemplary embodiment. A radar system 102 is generally located inside nose 100 of the aircraft or inside a cockpit of the aircraft. According to other exemplary embodiments, radar system 102 can be located on the top of the aircraft or on the tail of the aircraft. Radar system 102 can include or be coupled to an antenna system.

Radar system 102 advantageously utilizes two different types of polarization. Dual polarization can be achieved using two separate antennas or a single antenna. In one embodiment, the single antenna includes two antenna portions, each dedicated to a type of polarization. Preferably, the antennas or portions of a single antenna are configured for polarization orthogonal to each other to maximize the advantage from each type. For example, horizontally polarized (HP) antennas can give stronger returns for a given loop gain and range due to a higher radar cross section in a precipitative environment. Conversely, a vertically polarized antenna (VP) can be more forgiving in terms of multi-mode induced side lobes (ghost lobes) in certain commercial aircraft radomes. Also, some modes in multi-mode radars can more effectively exploit VP signals. According to some exemplary embodiments, right hand circular (RHC) or elliptical polarization and left hand circular (LHC) or elliptical polarization can be used, e.g. any combination of polarizations such that the polarizations are orthogonally opposed.

Advantageously, system 102 utilizes an antenna architecture that exploits dual polarization and redundant transmit/receive channels. The redundant transmitters receive channels can be implemented in common aperture. Each channel can be connected to independent, orthogonally polarized channels of a high gain antenna/feed manifold assembly. In addition, dual polarization antennas have the advantage that failure free operational time of system 102 can be increased by a factor of two. Additionally, the use of aperture embedded transmit/receive systems can improve radar loss by approximately four decibels. This improvement may be due to the elimination of flexible waveguide interconnects that are typically used to connect the antenna and pedestal on the aircraft bulkhead to the radar transceiver in the equipment tray located inside the aircraft cabin.

System 102 preferably provides a dual polarized radar antenna/feed assembly with high cross polarization isolation. The assembly can be designed so that radiating elements that are physically small enough to nest (e.g., interface with) two independent planar arrays into a common aperture with sufficiently small array lattice element spacing to ensure grating lobe-free operation. Further, system 102 can utilize compact dual channel (polarization) feed manifolds within the confines of the back of the antennae aperture. Further still, system 102 can provide flexibility in subarray feeding such that dual polarized operation can be realized in any of the following three modes: (1) pencil (sum) beam; (2) half aperture (for single axis switched aperture operation in either elevation or azimuth); and (3) dual polarization quadrant-based subarrays for two-axis (i.e., azimuth and elevation) switched aperture beam sharpening.

Figure 3:
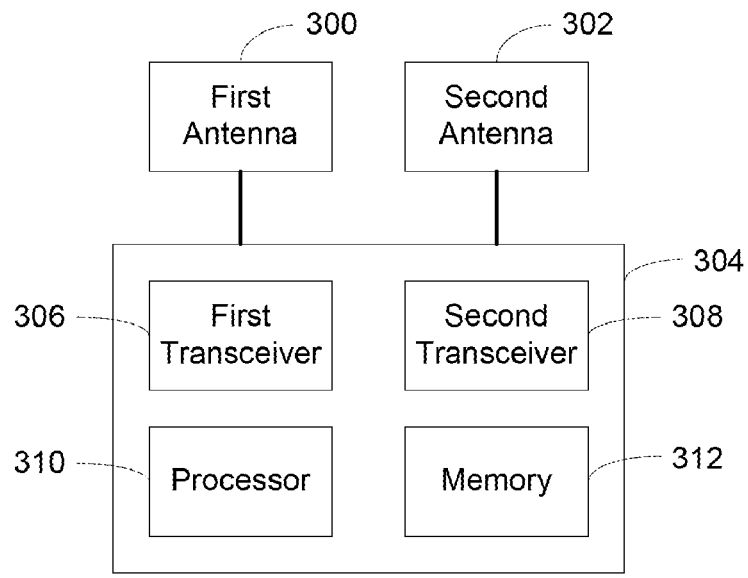
FIG. 3 is a block diagram of an antenna system for a weather radar system, according to an exemplary embodiment.

In FIG. 3, an embodiment of radar system 102 is shown as a radar system 304 according to an exemplary embodiment. Radar system 304 is coupled to a first antenna 300 and a second antenna 302. First antenna 300 and second antenna 302 can transmit and receive radar returns. Additionally, the polarization of the first antenna 300 can be orthogonal to the polarization of the second antenna 302. For example, the first antenna 300 can be horizontally polarized, while the second antenna 302 is vertically polarized. It should be appreciated that the first antenna 300 and the second antenna 302 (or any antennas or portions thereof discussed in this application) are not limited to either vertical polarization and/or horizontal polarization. The first antenna 300 and second antenna 302 can use horizontal polarization, vertical polarization, right hand circular (RHC) or elliptical polarization and left hand circular (LHC) or elliptical polarization. The first antenna 300 and second antenna 302 can use any combination of polarizations such that the polarizations are orthogonally opposed.

Referring to FIG. 3, radar system 304 can include a receive circuit or other circuit configured to receive data from the first antenna 300 and/or the second antenna 302 and to provide the data to processor 310. The radar system 304 can also include a first transceiver 306 and a second transceiver 308 allowing for the radar system 304 to utilize two independent transmit/receive channels in a common aperture. The first transceiver 306 and second transceiver 308 can be connected to the independent, orthogonally polarized channels of the first antenna 300 and second antenna 302. Furthermore, the first transceiver 306 and second transceiver 308 can be physically small enough such that two independent planar arrays can be interlaced into a common aperture.

Additionally, the radar system 304 can include a processor 310 and memory 312. According to various exemplary embodiments, processor 310 can be any hardware and/or software processor or processing architecture capable of executing instructions and operating on data related to the radar returns. The processor 312 can store information in memory 308 to be retrieved for later use. Memory 308 can be any volatile or non volatile memory.

Figure 4A:
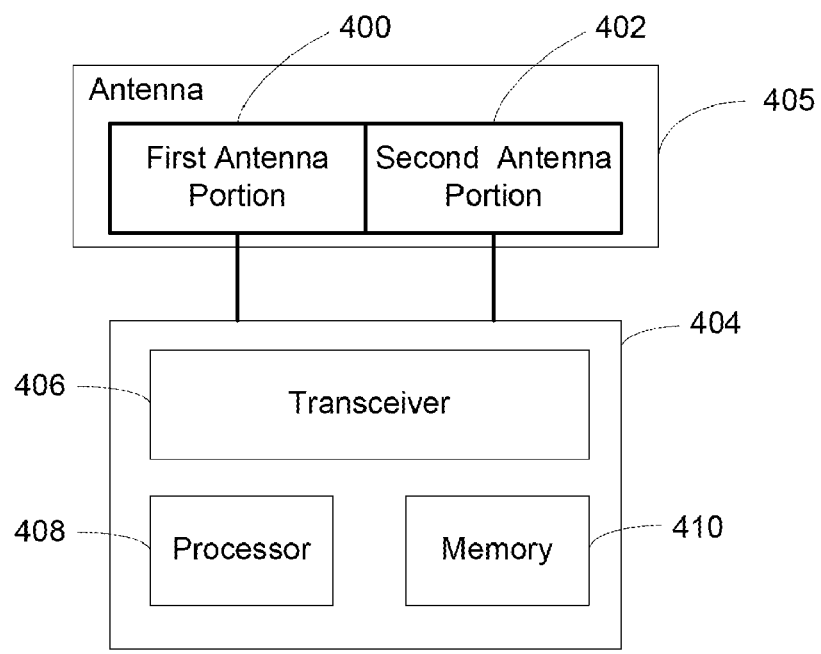
FIG. 4A is a block diagram of a further antenna system for a weather radar system, according to an exemplary embodiment.

Referring to FIG. 4A, an embodiment of radar system 102 is shown as radar-based Aircraft Warning Service (AWS) or weather radar system 404, according to an exemplary embodiment. The radar system 404 includes an antenna 405 having a first antenna portion 400 and a second antenna portion 402. The radar system 404 additionally includes a transceiver 406. The transceiver 406 can transmit and receive a first radar beam with the first antenna portion 400 and transmit and receive a second radar beam with the second antenna portion 402. Furthermore, the polarization of the first antenna portion 400 is orthogonal to the polarization of the second antenna portion 402. For example, the first antenna portion 400 can be vertically polarized while the second antenna portion 402 is horizontally polarized. Furthermore, the first antenna portion 400 and the second antenna portion 402 can use horizontal polarization, vertical polarization, right hand circular or elliptical polarization and left hand circular or elliptical polarization. The first antenna portion 400 and second antenna portion 402 can use any combination of polarizations such that the polarizations are orthogonally opposed.

The processor 408 of radar system 404 can be any hardware and/or software processor or processing architecture capable of executing instructions and operating on data related to the radar returns. The processor 408 can store information in memory 410 to be retrieved for later use. Memory 410 can be any volatile or non volatile memory. Systems 304 and 404 utilize the hardware of MultiScan radar systems manufactured by Rockwell Collins Inc. or other platforms for radar signal processing that have been configured for use with portions 400 and 402 or antennas 300 and 302.

The ability to use either VP or HP effectively (or statistically) improves the MTBF by a factor of two because portions 102, 304 and 404 vertical and horizontal polarization have two independent radar radio frequency (RF) front ends. Several operational modes exist for systems 102, 304 and 404.

1. Nominal HP system with VP as a redundant back up;
2. Nominal VP system with HP as a redundant back up;
3. Selectable HP/VP (or RHCP/LHCP) multimode operation; and
4. True simultaneous dual model polarametric system (HH, HV, HV, VH, or, RHCP/RHCP, RHCP/LHCP, LHCP/LHCP, LHCP/RHCP.

Figure 4B:
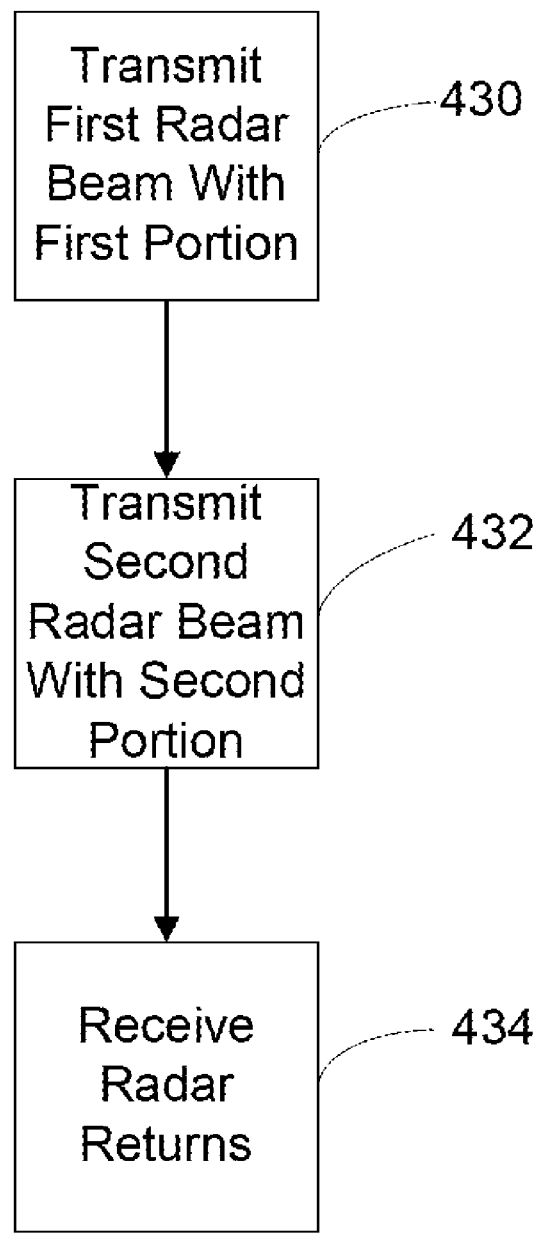
FIG. 4B is a flow chart of a method for using a dual polarization antenna.

Referring to FIG. 4B, a flow chart of a method for using a dual polarization antenna is shown, according to an exemplary embodiment. A first radar beam can be transmitted using a first portion of an antenna (step 430). Subsequently, a second radar beam can be transmitted using a second portion of the same antenna (step 432). Once both the first and second radar beams are transmitted, the method may receive the first and second radar beams using both the first and second portions of the antenna (step 434). Furthermore, it should be appreciated that the specific sequence of steps 430-432 can be completed in any order. For example, a radar beam can be transmitted with a second portion of an antenna before transmitting a radar beam with a first portion of an antenna.

Figure 5:
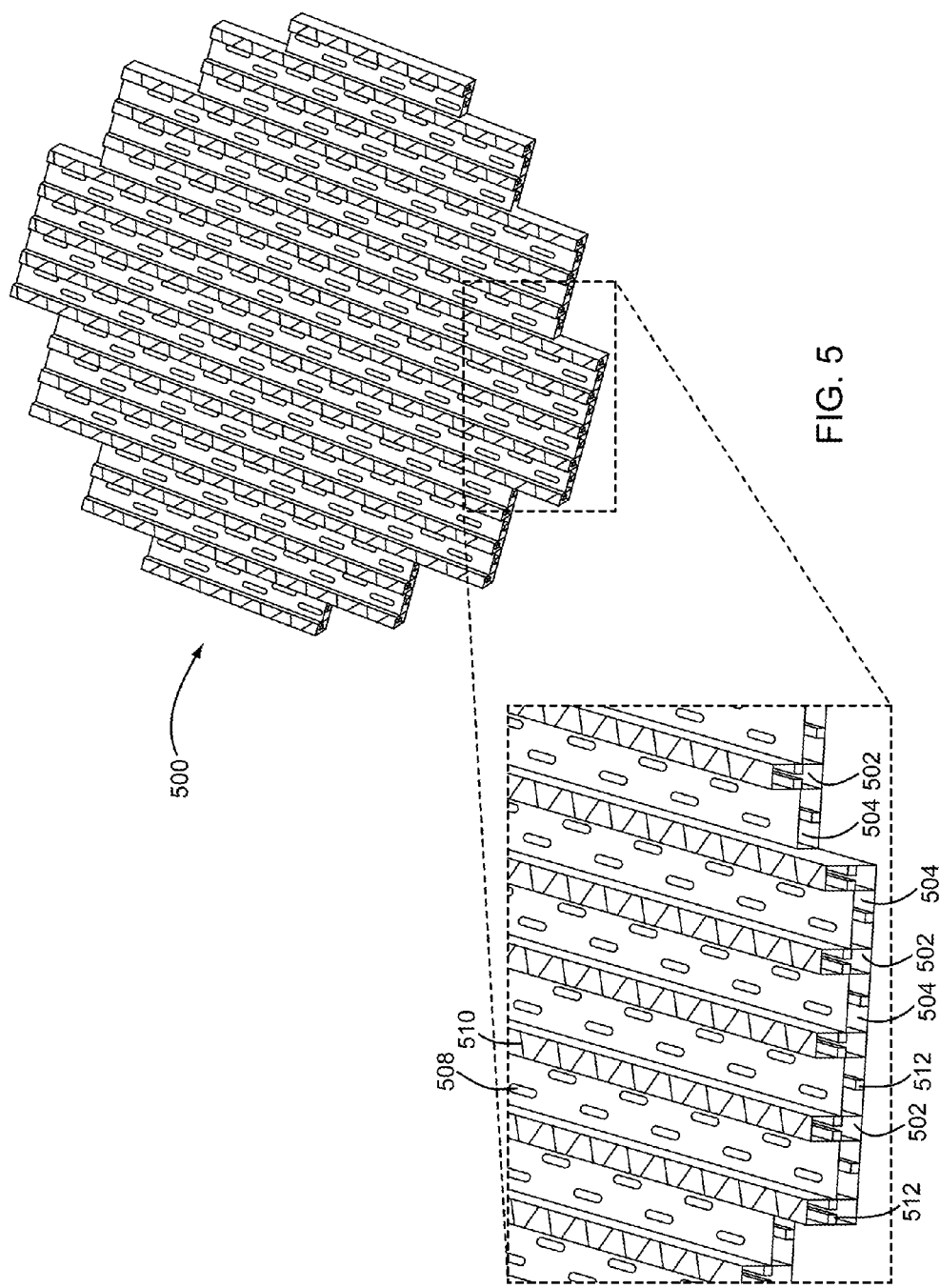
FIG. 5 is a perspective view of a waveguide aperture array schematic drawing including a dual manifold feed assembly for use in the antenna system illustrated in FIG. 4, according to an exemplary embodiment.

Referring to FIG. 5, an aperture 500 includes an array of waveguides and preferably includes a dual manifold feed assembly. The dual manifold feed assembly can be embodied as a waveguide aperture array 500 for use in antenna 405 or antennas 300 and 302, according to an exemplary embodiment. Aperture 500 includes broad wall radiating slots 508 in waveguides 504, edge radiating slots 510 in waveguides 502, and a dual manifold feed assembly. In a preferred embodiment, waveguide aperture array 500 can interface with the aperture of antenna 405 or antennas 300 and 302, thereby enabling dual polarization operation.

Waveguide aperture array 500 generally includes a dual manifold feed assembly. Dual manifolds are located a layer below waveguide sticks 502 (e.g., edge slot waveguides) and waveguides 504 (e.g., broad wall slot waveguide). According to various exemplary embodiments, the feed may be any of a number of topologies including corporate topologies, series topologies, parallel topologies, etc.

In one exemplary embodiment, waveguides 502 and 504 have a rectangular cross section. Assembly 506 is preferably an aluminum structure comprised of relatively hollow members. The feeds that drive waveguide sticks 502 and 504 can include individual radio frequency (RF) input/output (I/O) ports. Thus, edge slot waveguide 502 and broad wall slot waveguide 504 can be used to realize multiple simultaneous polarizations.

Furthermore, the dual manifold feed assembly can be configured to fit within the confines of the back of an antenna aperture. The dual manifold feed assembly may additionally include other waveguides, for example nested wall slot waveguides that can be configured to provide appropriate spacing for proper radiation performance.

Waveguides 502 and/or 504 generally include at least one ridge 512 that has a square or rectangular cross-section and extends within waveguides 502 and/or 504 to form a "ridged waveguide." The ridge waveguide advantageously has a narrow cross-section that a rectangular waveguide for the same operating bandwidth. The narrow cross-section allows tighter waveguide packing for topologies including nested grating lobe feeds and dual polarization apertures. Waveguides 502 and waveguides 504 can be dual or single ridge waveguides, thereby reducing the height or thickness of the edge slot waveguides 502. The dimensions of a non-ridged, rectangular edge slot aperture array 510 typically include a width of about 0.4 inches and a height of about 0.9 inches or less. According to an exemplary embodiment, the given dimensions are for an X-band application, but according to other exemplary embodiments the dimensions can be scaled for other operating bands for other applications.

Additionally, the depth and angles of edge radiating slots 510 within waveguide 502 can be configured for a specific aperture excitation to realize far field radiation characteristics (e.g., side lobe levels, gains, etc.). Thus, edge radiating slots 510 in waveguide 502 can resonate for a total "wrap around" length of one half wavelength.

In a preferred embodiment, the architecture of aperture 500 provides significant advantages. Aperture 500 can provide very high aperture efficiency associated with waveguide array architectures, natural dual-orthogonal polarization operation, and very low waveguide feed loss. Further, aperture 500 can provide flexibility in subarray feed locations thereby enabling flexibility in realizing pencil beam, half aperture, and quadrant based array configurations. Aperture 500 also can provide high polarization isolation and low coupling between the HP broad wall slotted subarray and the VP edge slotted subarray, and provides the ability to realize very low side lobe levels (co-polarization and cross-polarization), due to low "stick to stick" mutual coupling of broad wall slotted waveguide arrays and the ability to have the broad wall radiator function as an "RF choke" to the edge slotted radiators by proper waveguide design. Aperture 500 has a low recurring cost and is preferably also compatible with planar printed transmission line (e.g., microstrip, stripline, coplanar waveguide, fin line, etc.) feed manifold for active aperture applications. In addition, aperture 500 can alleviate potential element compaction problems using non-linear radiation slots (e.g., "I" slots, "C" slots, etc.).

Furthermore, according to a preferred exemplary embodiment, the dimensions of ridge 512 include a height of about 0.2 inches and a width of less than about 0.9 inches. According to an exemplary embodiment, the given dimensions are for an X-band application, but according to other exemplary embodiments the dimensions can be scaled for other operating bands for other applications. Additionally, ridge 512 can be configured for a first order response to resonate for a length of one half wavelength. It should be appreciated the aforementioned dimensions are by way of example only. The dimensions of the individual components can be adjusted to accommodate various configurations and wavelengths. For example, the height, width, and length of ridge 512 or edge radiation slots 510 can be adjusted to compensate for appropriate changes in waveguide to waveguide spacing, thereby ensuring proper radiation performance.

The embodiment shown in FIG. 5 can be used in a variety of antenna systems and antenna system feed locations. For example, the embodiment of FIG. 5 can be used in the antenna systems the weather radar systems of FIGS. 3 and 4. Additionally, the flexibility of aperture 500 enables it to realize various methods of weather radar system or radar-based TAWS operation. For example, aperture 500 can be used to realize a pencil radar beam, a half-aperture radar beam, or a quadrant based array configuration. Furthermore, the waveguides of aperture 500 can be arranged such that the apertures are non-linear (e.g., non-uniform waveguide-to-waveguide spacing across two-dimensional antenna aperture 500), thereby alleviating potential problems with element compaction. Further, the element spacing of aperture 500 can be small enough to operate with fewer grating lobes or without grating lobes.

Figure 6:
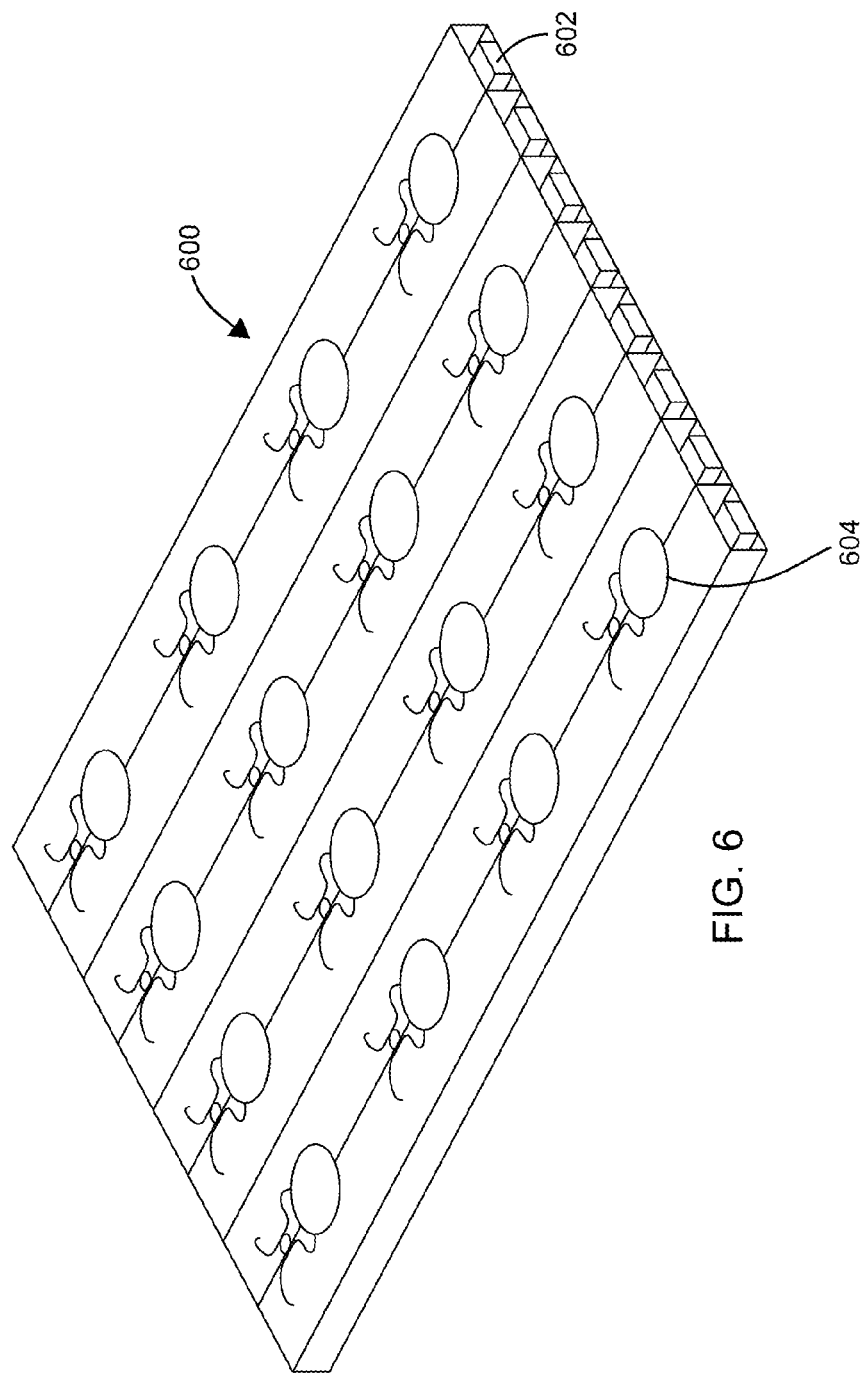
FIG. 6 is a perspective view schematic drawing of a microstrip radiating element array for use in the antenna system illustrated in FIG. 4, according to an exemplary embodiment.

Referring to FIG. 6, an array 600 of radiating elements for use in antenna 405 or antennas 302 and 304 is shown, according to an exemplary embodiment. In a preferred embodiment, array 600 is a microstrip radiating element array and can be configured to interface with the aperture of either antennas 300 and 302 or antenna 405. Array 600 includes a microstrip radiator 604 that can be driven in multiple modes for simultaneous orthogonal polarization.

Radiator 604 is an RF printed circuit board that includes metallic elements, such as copper, disposed on a printed circuit board substrate (e.g., the medium of array 600). The RF substrate containing the microstrip radiating element can reside one or more waveguides 602 (e.g., ridge waveguides) of array 600.

Array 600 can be driven in vertical and horizontal polarization, right hand and left hand circular polarization, or any other combination thereof. Waveguides 602 form a low loss feeding structure and can be embodied as a rectangular shaped member disposed in a channel in the medium of array 600. While waveguide 602 is shown in FIG. 6 as a ridge waveguide, it should be appreciated that waveguide 602 can also include a printed microstrip, a stripline, a coplanar waveguide, a finline, etc. Furthermore, it should be noted that array 600 can be used in the embodiments of FIGS. 3 and 4.

According to a preferred exemplary embodiment, the width of waveguide 602 is typically less than about 0.9 inches. Additionally, the spacing between microstrip radiators 604 is typically about $0.7\lambda_g$, where $\lambda_g$ is the wavelength of a signal in waveguide 602.

Further, the preferred diameter of microstrip radiator 604 can be solved for by the equation $\lambda_o/\sqrt{\in_r}$, where $\lambda_o=1.265$ inches at about 9.33 GHz, and $\in_r$ is the effective relative dielectric constant of the printed circuit board material used to realize the microstrip patch radiator. Additionally, the height of microstrip radiator 604 is preferably very small relative to the wavelength.

Furthermore, it should be appreciated that the dimensions and arrangement of the aforementioned elements are by way of example only. The specific arrangement, spacing, and dimensions of the elements can vary to accommodate further embodiments. For example, the width of waveguide 602 can be adjusted to accommodate waveguide to waveguide spacing requirements. Furthermore, the diameter of microstrip radiator 604 can vary based on the required wavelength and/or dielectric constant of the printed circuit board material used.

Figure 7:
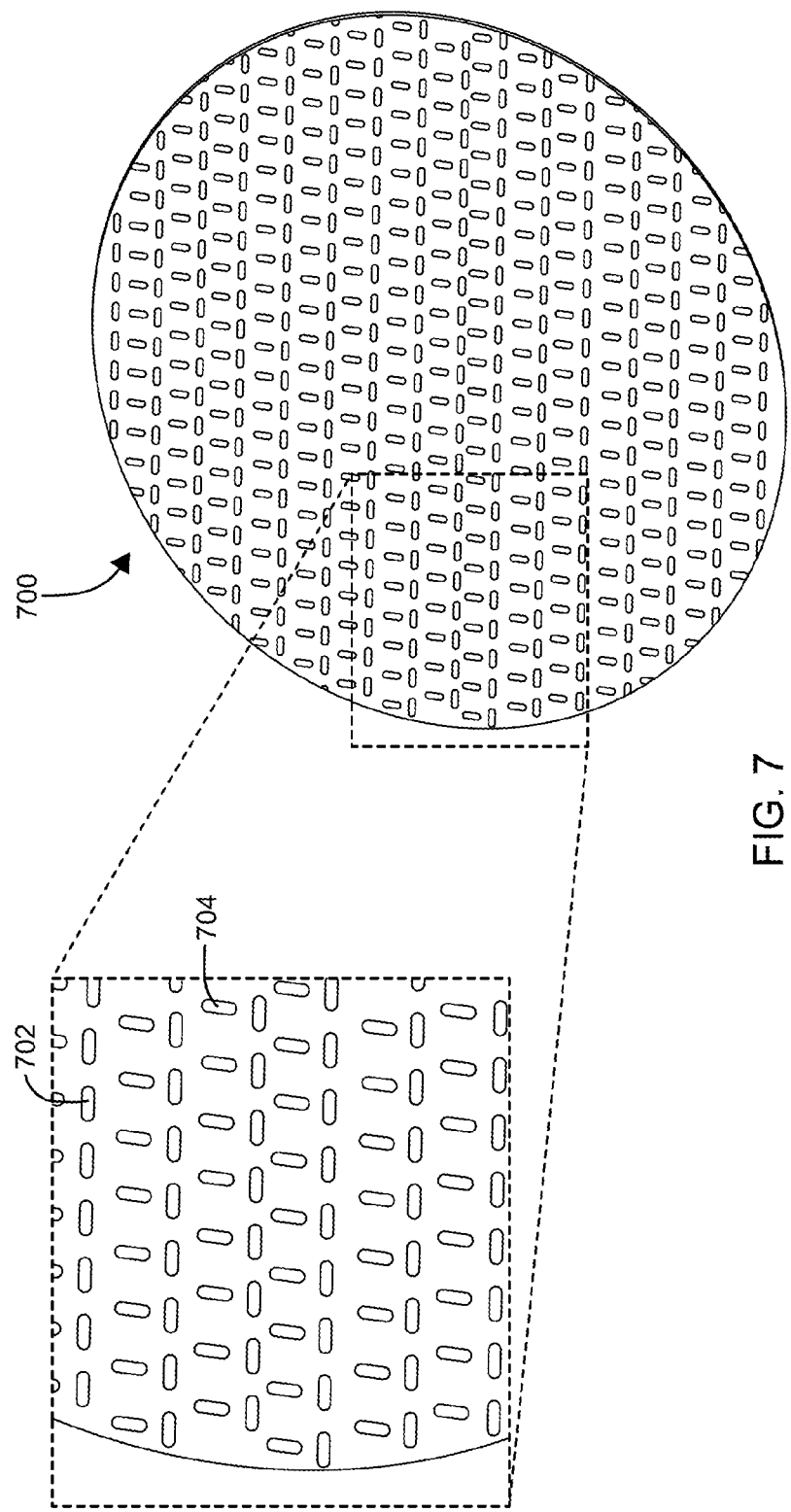
FIG. 7 is a perspective view schematic drawing of a slotted stripline array for use in the antenna system of FIG. 4, according to an exemplary embodiment.

Referring to FIG. 7, an array 700 for use in antenna 405 or antennas 302 and 304 is shown, according to an exemplary embodiment. Array 700 can be embodied as a slotted stripline array. In a preferred embodiment, array 700 can be configured to interface with the aperture of either antenna 405 or antennas 300 and 302. Slotted stripline array 700 includes interlaced arrays 702 and arrays 704. Arrays 702 and 704 can include oval, rectangular or other shaped slots or apertures disposed on a top surface of the medium (e.g., Teflon® material) for array 700. Arrays 702 can be HP stripline arrays and arrays 704 can be VP stripline arrays. Additionally, arrays 702 and arrays 704 can be arranged in rectangular or hexagonal arrays. Furthermore, the slotted stripline apertures of the embodiment of FIG. 7 can be non-linear and compact, thereby alleviating element compaction problems and realizing grating lobe free operation.

According to a preferred exemplary embodiment, the diameter of horizontally polarized stripline array 702 and vertically polarized stripline array 704 can be determined with the equation $d=\lambda_o/(\sqrt{\in_r}\times 2)$. For Teflon based materials, this typically results in a diameter of approximately 0.414 inches. Additionally, a length to width ratio of about 5:1 to about 10:1 is applied to the diameter of horizontally polarized stripline array 702 and vertically polarized stripline array 704. Further, the thickness of slotted stripline array 700 is typically less than about 0.200 inches.

Furthermore, it should be appreciated that the dimensions and arrangement of the aforementioned elements are by way of example only. The specific arrangement, spacing, and dimensions of the elements can vary to accommodate further embodiments. For example, the diameter and length to width ratios of the horizontally polarized stripline array 702 and vertically polarized stripline array 704 can vary based on wavelength and the dielectric constant of the material used. Additionally, the thickness of slotted stripline array 700 can be adjusted to accommodate other embodiments.

Furthermore, it should be appreciated that the embodiments of FIGS. 5-7 can be configured to interface to the antenna aperture in multiple methods. For example, according to one embodiment, each of the dual orthogonal apertures can include an individual feed network. The individual feed network can be configured to terminate in a single RF I/O port. Therefore, each dual orthogonal aperture can include an individual RF I/O port. Thus, dual orthogonal polarizations can be realized.

According to another embodiment, orthogonally polarized apertures can be fed with individual transmit/receive modules. The RF I/O of each transmit/receive module can then be combined to process the aggregate signal of the entire planar aperture. Thus, two active radar apertures can be realized, one for each orthogonal polarization.

While the detailed drawings, specific examples, detailed algorithms, and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. For example, the scope of the claims are intended to cover any technique that uses a selectable fractional aperture unless literally delineated from the claims. Furthermore, other substitutions, modifications, changes, and omissions may be made in the design, operating conditions, and arrangement of the exemplary embodiments without departing from the scope of the invention as expressed in the appended claims.

What is claimed is:

1. An antenna system for a weather radar system, comprising:
   a first antenna portion; and
   a second antenna portion, the polarization of the first antenna portion being orthogonal to the polarization of the second antenna portion, wherein the first antenna portion and the second antenna portion are physically interlaced to occupy the same volume and include a first waveguide array and a second waveguide array, wherein first waveguides in the first waveguide array are arranged interstitially with respect to second waveguides in the second waveguide array, wherein the first waveguides are taller than the second waveguides and the second waveguides are broader than the first waveguide, wherein the first waveguides include at least two internally disposed ridge elements and the second waveguides include at least one internally disposed ridge element, the ridge elements being elements extending longitudinally down its respective waveguide, wherein the ridge element in the first waveguides are disposed at a height coplanar with a top surface of the second waveguides and the ridge elements of the second waveguide is disposed on a bottom surface opposite the top surface in a plane bisecting the second waveguide.

2. The antenna system of claim 1, further comprising a first transceiver channel and a second transceiver channel, wherein the first transceiver channel is horizontally polarized and the second transceiver channel is vertically polarized.

3. The antenna system of claim 1, further comprising a first transceiver channel and a second transceiver channel, wherein the first transceiver channel has a right hand circular or elliptical polarization and the second transceiver channel has a left hand circular or elliptical polarization.

4. The antenna system of claim 1, wherein the first and second antenna portions comprise radiating elements that interlace two independent planar arrays into a common aperture, the first waveguides and second waveguides have a common bottom planar surface.

5. The antenna system of claim 4, wherein an array lattice element spacing is configured such that operation is grating lobe free.

6. The antenna system of claim 1, further comprising:
   dual channel feed manifolds within the confines of a back of an antenna aperture.

7. The antenna system of claim 1, wherein weather radar system operation comprises a pencil radar beam.

8. The antenna system of claim 1, wherein weather radar system operation comprises a half-aperture radar beam for single axis switched aperture operation in elevation and/or azimuth.

9. The antenna system of claim 1, wherein weather radar system operation comprises quadrant-based sub-arrays for two-axis switched aperture beam sharpening.

10. The antenna system of claim 1, further comprising wherein:
    the first waveguide array and the second waveguide array are nested.

11. The antenna system of claim 1, wherein:
    the first waveguides form an edge slot array and the second waveguides form a broad wall slot array.

12. The antenna system of claim 11, wherein the ridge elements have a rectangular cross section.

13. The antenna system of claim 1, wherein the first and second portions are linearly polarized.

14. The antenna system of claim 13, wherein the first and second waveguides are substantially hollow.

15. The antenna system of claim 13, wherein the first and second portions have non-linear slots.

16. A method for detecting weather using a weather radar system, comprising:
    transmitting a first radar beam with a first portion of an antenna;
    transmitting a second radar beam with a second portion of the antenna; and
    receiving radar returns from the first and second radar beams at the first and second portions of the antenna, wherein the first portion of the antenna has a polarization that is orthogonal to a polarization of the second portion of the antenna, and wherein the first portion of the antenna and the second portion of the antenna are physically interlaced to occupy the same volume and the antenna includes alternatively disposed first waveguides associated with the first portion and second waveguides associated with the second portion, wherein the first waveguides are substantially hollow and include at least two ridge elements and the second waveguides are substantially hollow and include at least one ridge element, wherein the first waveguides are narrower and taller than the second waveguides and the two ridge elements in the first waveguides are disposed on opposite side walls of the first waveguide at a height of a top surface of the second waveguide, and wherein the ridge elements of the second waveguide are disposed on a bottom surface opposite the top surface.

17. The method of claim 16, wherein the first portion of the antenna is horizontally polarized and the second portion of the antenna is vertically polarized.

18. The method of claim 16, wherein the first portion of the antenna has a right hand circular or elliptical polarization and the second portion of the antenna has a left hand circular or elliptical polarization.

19. A weather radar system, comprising:
    a first antenna portion; and
    a second antenna portion, the polarization of the first antenna portion being orthogonal to the polarization of the second antenna portion, wherein the first antenna portion and the second antenna portion are physically interlaced to occupy the same volume, wherein sets of first and second waveguides form a combination of the first antenna portion and the second antenna portion, the first waveguides each including at least two ridge elements and the second waveguides each including at least one ridge element, the waveguides being narrow edge waveguides having a height greater than the second waveguides, the second waveguides being broad waveguides having a width greater than the first waveguides, wherein the ridge elements of the first waveguides are disposed coplanar with a top surface of the second waveguides and are disposed on a plane bisecting the first waveguides between a top surface of the first waveguide and a bottom surface of the first waveguide.

20. The weather radar system of claim 19, wherein the ridge elements are longitudinally disposed.

* * * * *